Patented July 15, 1941

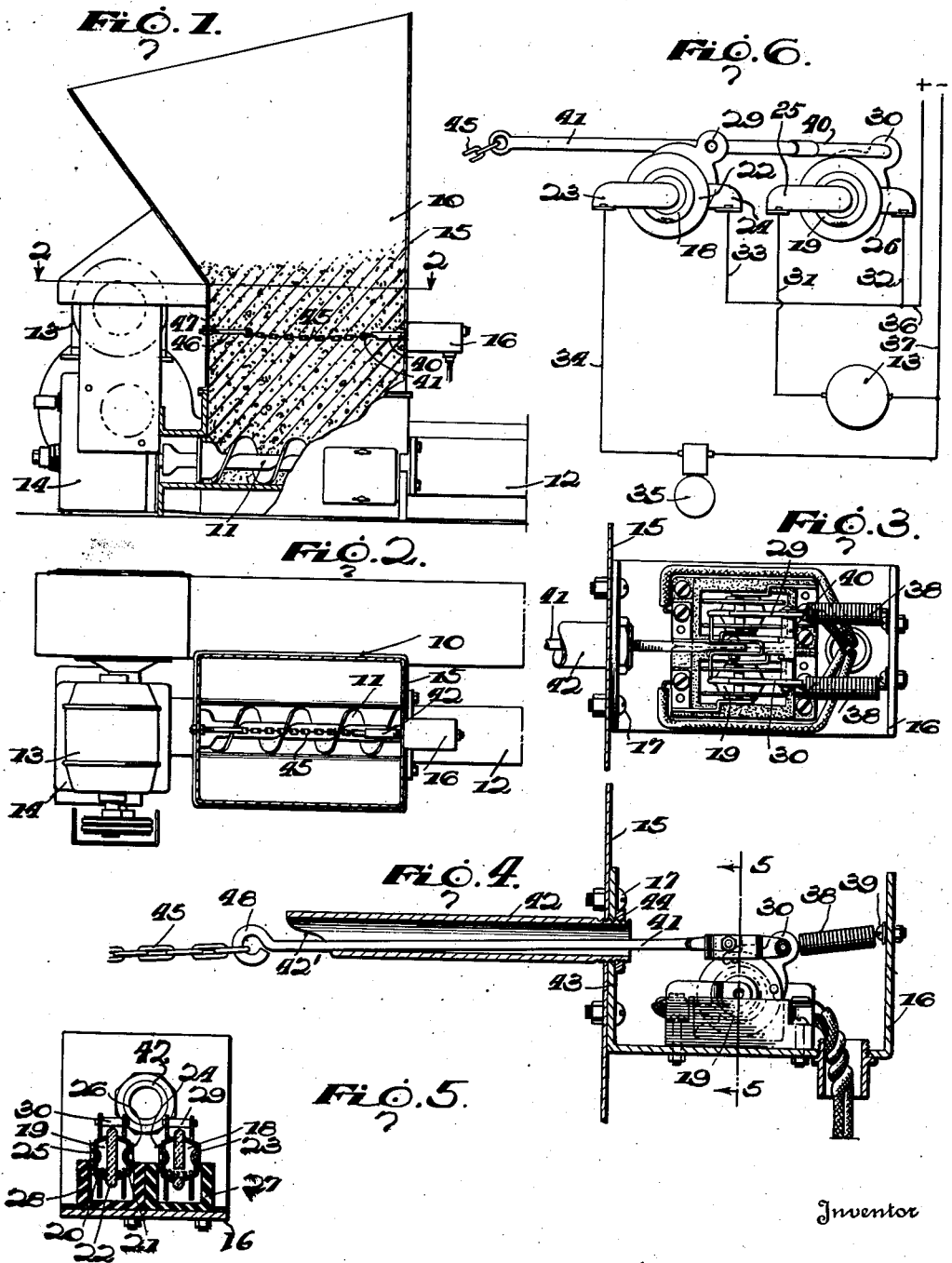

2,249,372

UNITED STATES PATENT OFFICE 2,249,372

HOPPER FEED CONTROL AND SIGNAL

John A. Askenback, Westport, Conn.

Application July 5, 1940, Serial No. 344,186

10 Claims. (Cl. 198—64)

The present invention relates to control and signal means for motor driven feed devices used for feeding material from a bin or hopper, such as the feed mechanism of automatic coal stokers.

A primary object of the invention is to provide a simple and reliable mechanism in combination with a hopper or bin and a motor driven feed device for delivering material, such as coal, from the hopper or bin which will function to stop the feed mechanism when the level of material in the hopper or bin falls below a desirable level and to actuate a signal to indicate that the hopper or bin needs refilling.

The invention is particularly applicable to automatic coal stokers and will be described in connection with such a device.

Many attempts have been made to provide a means responsive to the pressure of coal or other material in a hopper to cut off the motor drive of the feed mechanism or to sound an alarm when the level of material in the hopper becomes too low. However, none of the prior proposals have proven satisfactory because of the fact that they are so constructed or located as to be rendered unreliable in operation due to pieces of coal lodging in such positions as to prevent operation of the mechanism or due to the building up of a hard deposit around the walls of the hopper which interferes with the operation of the pressure-responsive members.

Experience with the operation of automatic coal stokers has shown that as the feed screw takes the coal from the hopper, the coal is always fed first from the center of the hopper directly above the opening to the feed screw and a deposit of coal is left around the sides of the hopper which feeds more slowly and in fact very often fails to slide down even when the hopper is otherwise completely emptied. These side deposits often become very hard and solid, particularly when feeding moist coal of a powdery nature, and have a tendency to form a blanket over and to freeze any controls mounted adjacent the walls of the hopper.

It is among the objects of the invention to provide feed control mechanism associated with a hopper or bin which will function with certainty, regardless of any deposit which may build up around the walls of the hopper or bin, so as to stop operation of the feed mechanism when the hopper is emptied below a desired level.

Another object of the invention is to provide in combination with a hopper, bin, or the like, and a motor driven feed mechanism associated therewith, a control for said feed mechanism comprising a flexible member extending across the hopper in the path of the coal or the like therein and located just above the feed mechanism and to provide means associated with said flexible member for preventing interference with its operation by reason of the building up of any deposits on the sides of the hopper or bin in the area thereof.

Other objects and advantages of the invention will be apparent from the following detailed description of a preferred embodiment of the invention with reference to the accompanying drawing illustrating such preferred embodiment.

In the drawing—

Fig. 1 is a vertical sectional view, partially in side elevation, of a stoker feed embodying the invention, Fig. 2 is a horizontal section taken on the line 2—2 of Fig. 1, Fig. 3 is an enlarged detail view of the switch means forming part of the control mechanism, Fig. 4 is an enlarged fragmentary sectional view through the side of the hopper showing the mounting of the switch mechanism and one end connection of the flexible pressure responsive member, Fig. 5 is a sectional view on the line 5—5 of Fig. 4, and Fig. 6 is a diagrammatic view illustrating the connections employed in the control circuit.

Referring more particularly to the drawing, 10 is the hopper of an automatic stoker from the bottom of which a feed screw 11 delivers coal through a conveyor tube 12 to a furnace, not shown. The feed screw is driven by an electric motor 13 through a reduction gearing indicated at 14, the particular structure of which forms no part of the invention.

Mounted on the outer side of the side wall 15 of the hopper 10, directly above the screw 11, is a switch mounting bracket or housing 16, which is secured in position by bolts 17. A pair of mercury switches 18 and 19 are mounted in the switch housing 16. These switches are of a well known rocking or rotary type in which the mercury is contained in a cylindrical casing formed of metal cups 20 and 21 separated by an insulating disc 22 which is apertured at one point adjacent the rims of the cups so that in one position the mercury bridges the disc through the aperture to complete the circuit between the cups and in other positions is separated by the disc to break the circuit. The switches 18 and 19 are mounted on trunnions 23—24 and 25—26 in the form of spring arms carried by base blocks 27 and 28, respectively, the spring arms forming connectors for the lead wires to and from the switches. The switches 18 and 19 are provided with operating arms 29 and 30, respectively.

The trunnion connectors 25 and 26 are connected in series with the motor 13 by wires 31 and 32 and the trunnion connectors 23 and 24 are connected by wires 33 and 34 in series with a signal such as a bell 35. Lead wires 36 and 37 from the usual motor control relay, not shown, complete the motor and signal circuits. The switches are arranged so that when rocked to one position the circuit through one will be completed and the other broken, and vice versa, and are biased to the position in which the motor circuit is broken and the alarm circuit completed by springs 38 fastened at one end to the operating arms 29 and 30 and at the other end to the outer wall of the housing 16 as at 39.

The switches 18 and 19 are connected together for simultaneous operation by a cross bar 40 connected at its ends to the operating arms 29 and 30. The cross bar 40 is connected to the outer end of reciprocating pull rod 41 which works in a tubular guide 42 extending through the hopper wall 15 in a horizontal direction above the feed screw 11. The guide tube 42 is threaded at one end into the wall 43 of the switch housing and is secured by a lock nut 44. As will be seen from Figs. 1 and 2, the guide tube 42 projects into the hopper an appreciable distance so that its inner end will be beyond the area of any deposit which may build up on the wall 15. The inner end of the tube 42 is cut away on the underside as indicated at 42'. The overhanging upper end portion thus prevents entrance of coal particles into the tube which might otherwise lodge therein and interfere with operation of the rod 41.

The pull rod 41 extends through and beyond the inner end of the tube 42 and is connected to one end of a flexible member 45, which may be a chain or other suitable means exposed to the weight of the coal in the hopper. The other end of the flexible member 45 is connected to the end of an eye bolt or other rigid rod 46 carried by and extending horizontally inwardly from the opposite hopper wall 47 in line with the guide tube 40 and pull rod 41. For convenience in manufacture and assembly the pull rod 41 is formed with an eye 48 at its inner end to which the end of the chain 45 is secured.

It is to be observed that the flexible weight responsive member 45 is suspended between the inwardly projecting ends of the rods 41 and 46 across the central portion of the hopper directly above the feed screw 11 so that its operation will not be interfered with by the building up of any hard deposits on the hopper walls.

The operation of the motor control and signal mechanism will be readily understood from the above. As long as there is coal in the hopper above the level of the member 45, the weight of the coal thus imposed thereon will tension the same so as to exert a pull on the rod 41 sufficient to overcome the force of the biasing springs 38 so as to rock the switches 18 and 19 from the position shown to a position in which the motor circuit through the switch 19 will be completed and the signal circuit through the switch 18 will be broken. When the level of coal in the hopper falls dangerously low, thus relieving the weight on the flexible member 45, the springs 38 rock the switches in the opposite direction, at the same time shifting the rod 41 to the right, and in this position, the motor circuit will be broken and the signal circuit will be completed, thus notifying the attendant that the hopper needs refilling.

Although a preferred embodiment of the invention has been shown and described by way of illustration, it will be understood that various modifications in the details of construction and mode of operation may be resorted to and that application thereof to various hopper feed mechanisms, other than coal stokers, may be resorted to without departing from the spirit of the invention within the scope of the appended claims.

I claim:

1. The combination with a hopper, a feeder for conveying material from said hopper, drive means for driving said feeder and means for controlling said drive means, of an elongated flexible member extending across the passage through said hopper and suspended by its ends between opposite walls of said hopper and exposed to the weight of material above said feeder, and a connection from one end of said flexible member to said means for controlling said drive means.

2. The combination with a hopper, a feeder for conveying material from said hopper, an electric motor for driving said feeder, a circuit for said electric motor, and a switch for controlling said circuit, of an elongated flexible member extending across the passage through said hopper and suspended by its ends between opposite walls of said hopper above said feeder and exposed to the weight of material in said hopper, and a connection from one end of said flexible member to said switch for closing the latter in response to the weight of material in said hopper on said flexible member.

3. The combination with a hopper, a feeder for conveying material from the hopper, an electric motor for driving said feeder, a circuit for said motor, and an electric switch mounted on said hopper for controlling said motor circuit, of an elongated flexible member extending substantially horizontally across said hopper above said feeder, said flexible member having one end fastened to a wall of said hopper opposite said switch and the other end connected to said switch.

4. The combination defined in claim 3 in which the elongated flexible member is suspended in the hopper between a horizontally disposed rodlike supporting member rigidly secured to one wall of the hopper and a horizontally slidable rod-like supporting member extending through an opposite wall of the hopper and operatively connected to the switch.

5. The combination with a hopper, a feeder for conveying material from said hopper, an electric motor for driving said feeder, a circuit for said electric motor, and a switch for controlling said circuit, of a horizontally disposed rod-like supporting member extending inwardly from one wall of said hopper adjacent the lower portion thereof, a horizontally disposed tubular guide member extending inwardly from the opposite wall of said hopper in substantial alinement with said rod-like supporting member, an elongated flexible member having one end thereof connected to the inner end of said rod-like supporting member, a reciprocable connector member extending through said tubular guide member into said hopper connected with the other end of said flexible member whereby the latter is suspended across said hopper exposed to the weight of material therein, and a connection between said reciprocable connector and said switch.

6. The combination with a hopper, a feeder for conveying material from said hopper, an electric motor for driving said feeder, a circuit for said motor and a switch for controlling said circuit, of a horizontally disposed rod-like supporting member projecting into said hopper from one side wall thereof above said feeder, a horizontally disposed tubular guide member projecting into said hopper at a point substantially opposite said supporting member, a pull rod extending through said tubular guide into said hopper, a flexible member suspended between the opposed ends of said rod-like supporting member and said pull rod, and a connection from the other end of said pull rod to said switch.

7. The combination with a hopper, a feeder for conveying material from said hopper, an electric motor for driving said feeder and a circuit for said motor, of an electric switch for controlling the motor circuit mounted on said hopper above the level of said feeder, means for biasing said switch to a position to open said circuit, a horizontally disposed tubular member extending through the wall of said hopper from adjacent said switch, a pull rod connected to said switch and extending through said tubular member into said hopper, and a flexible elongated member having one end connected to said pull rod and extending across said hopper and anchored at its other end to the hopper wall opposite said tubular member, whereby the weight of material in said hopper on said flexible member exerts a pulling force on said pull rod to close said switch.

8. The combination defined in claim 7 in which a substantially rigid rod-like element projects into said hopper from a point opposite said tubular member and in which the anchored end of said flexible member is connected thereto.

9. The combination with a hopper, a feeder for conveying material from said hopper, an electric motor for driving said feeder, and a circuit for said motor, of a switch housing mounted on said hopper above the level of said feeder, a pair of switches mounted in said switch housing, means for biasing said switches to a position in which the circuit through one is completed and the circuit through the other is broken, means for connecting said switches for simultaneous operation as a unit, one of said switches being connected in the circuit of said motor, an electrically operated signal in circuit with the other switch, a horizontally disposed tubular guide member leading from said switch housing and projecting into said hopper, a pull rod connected to said switch and extending through said tubular guide member into said hopper, and an elongated flexible member connected at one end thereof to the end of said pull rod in said hopper and having its other end fastened to the opposite wall of said housing, whereby said flexible member is exposed to the weight of material in said hopper.

10. The combination defined in claim 7 in which the flexible member comprises a chain.

JOHN A. ASKENBACK.